Dec. 30, 1930.   R. A. KING   1,787,112
CLOSET AUGER AND STOPPAGE GRIP
Filed March 8, 1928
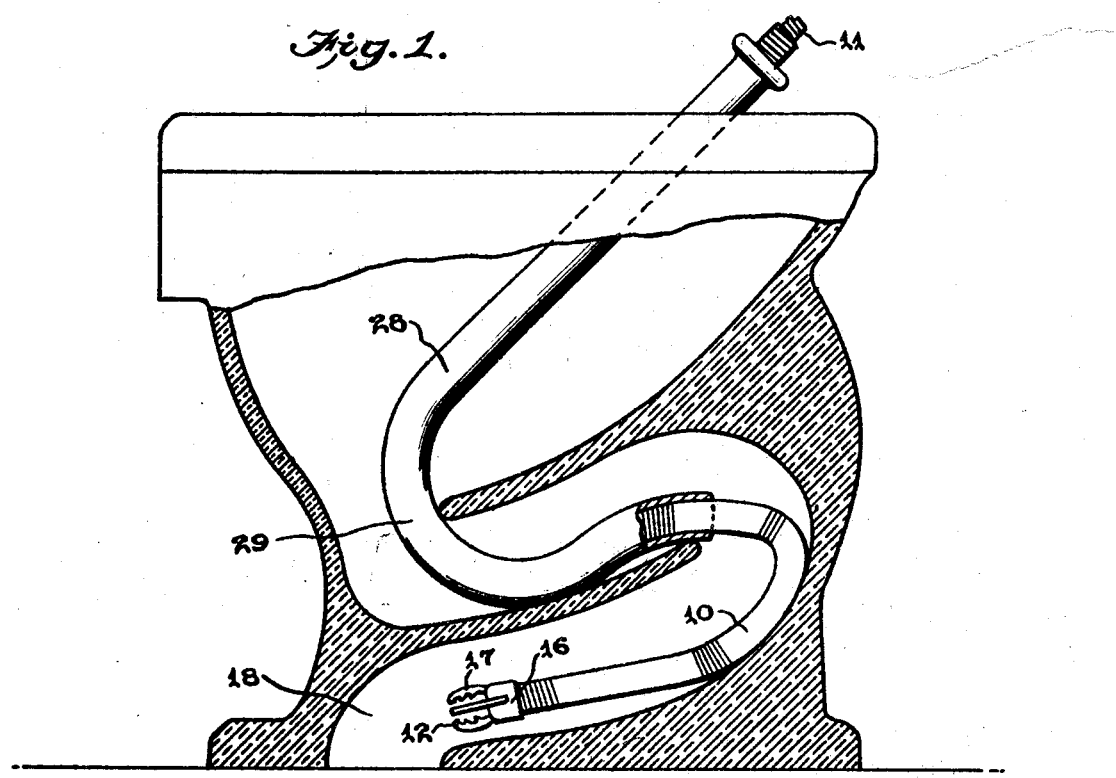
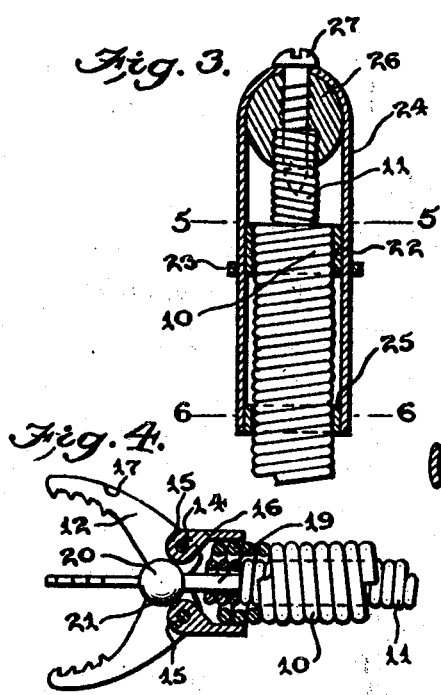
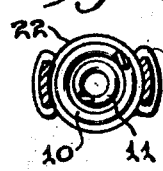
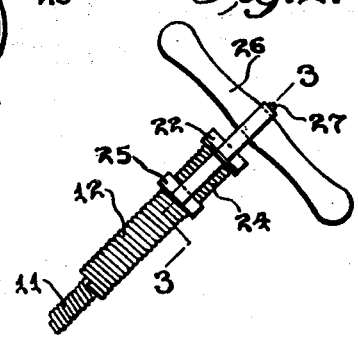
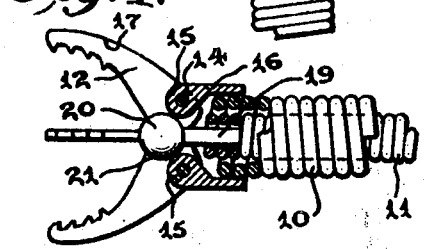
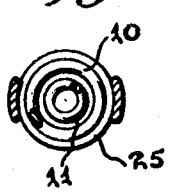
Inventor
Randall A. King
By *[signature]*
Attorney Patented Dec. 30, 1930

1,787,112

UNITED STATES PATENT OFFICE

RANDALL A. KING, OF PUEBLO, COLORADO

CLOSET AUGER AND STOPPAGE GRIP

Application filed March 8, 1928. Serial No. 260,086.

The object of the invention is to provide a device readily adaptable for placement in a toilet and capable of operation for clearing a stoppage therein by a boring operation; to provide a device of this character terminally equipped with a gripper actuable at the exposed end of the device for engagement with the substance causing the stoppage, so that the latter may be readily withdrawn; and to provide a device of this nature which while efficient in operation, is of simple form and therefore susceptible of cheap manufacture and low marketing cost.

With this object in view, the invention consists in a construction and combination of parts of which a preferred embodiment is illustrated in the accompanying drawings, wherein;

Figure 1 is a sectional view of a conventional closet showing the apparatus applied in operative position therein.

Figure 2 is an elevational view of the actuating end of the device.

Figure 3 is a sectional view on the plane indicated by the line 3—3 of Figure 2.

Figure 4 is a detail sectional view of the gripping and boring end of the device.

Figures 5 and 6 are sectional views respectively on the planes indicated by the lines 5—5 and 6—6 of Figure 3.

The invention comprises a flexible staff 10 which is of tubular form and a stem 11, the latter being enclosed by the staff and being slidable axially of the same. Both the staff and stem are formed preferably of spring wire of which the convolutions are in close contact, the direction of winding of the stem being the reverse of that of the staff.

At the working end of the staff is carried a combined gripper and borer, the latter consisting of the jaws 12 which are pivotally mounted on pins 14 spanning ears 15 of a head 16, the latter being connected with the end of the staff. In the closed position of the jaws which is a position where their outer or free ends are in close proximity, the head is set or adjusted to perform the boring operation, the outer edges 17 of the jaws cutting into any obstruction that may be present in the closet siphon 18.

Opening and closing movement is imparted to the jaws by means of the stem 11, the latter at that end of the staff to which the head 16 is connected being engaged with a shank 19 radially extending from a ball 20 which is engaged in arcuate seats 21 on the jaws 12. Obviously axial movement of the stem will shift the ball 20 and thereby open and close the jaws by reason of this engagement in the seats 21.

The staff 10 at the operating end is provided with a cap 22 on diametrically opposite sides of which are formed lateral ears 23 having arcuate slots in which the arms of the handle yoke 24 are slidably engaged, the extremities of these arms being connected with a guide ring 25 in surrounding relation to the staff and slidable thereover. The handle 26 is seated in the crotch of the yoke to which it is secured by means of a screw 27. The upper end of the stem engages in a lateral socket in the handle and is secured to the same. The construction just described provides for movement of the yoke longitudinally of the staff and therefore provides for movement of the handle axially of the staff. Since the stem is connected with a handle, this movement of the handle will, by reason of the ball connection with the jaws, effect opening and closing movement of the latter.

Since the arms of the yoke are engaged with the ears of the cap 22, angular or turning movement of the handle will effect rotary or turning movement of the staff, so that the head by this means, can be rotated to perform any boring operation found necessary.

An important element of the device is the guide tube 28 formed at one end with a goose-neck 29. The staff is slidably mounted in the guide tube and is of a length considerably greater than the latter. In initiating a cleaning operation with the device, the staff is pulled through the guide tube until the boring head is adjacent the end of the gooseneck. The tube is then placed in the closet with the goose-neck in the up-leg of the siphon, after which the boring head is advanced by forcing the staff longitudinally through the guide tube. Preferably, in this operation the jaws are in closed position and the staff may be rotated by the handle to bore into any obstruction that may be in a siphon or the waste pipe. If the obstruction can not be unlodged by this method, the jaws of the head may be opened by forcing the stem longitudinally of the staff, thus gripping the obstruction when the stem is retracted and the jaws closed upon it. The obstructing matter may then be withdrawn by pulling the staff back through the tube and finally removing the latter from its position in the siphon.

The invention having been described, what is claimed as new and useful is:

1. A device for the purpose indicated comprising a staff, a stem movable longitudinally of the staff, a head carried at one end of the staff and provided with a plurality of hingedly mounted jaws, operative connections between the stem and jaws to effect opening and closing movement of the same upon the stem relative to the staff, and a handle having operative connections with the stem remote from the head for imparting longitudinal movement to the same and operative connections with the staff for imparting angular or turning movement to the same.

2. A device for the purpose indicated comprising a staff, a stem movable longitudinally of the staff, a head carried at one end of the staff and provided with a plurality of hingedly mounted jaws, operative connections between the stem and jaws to effect opening and closing movement of the same upon the stem relative to the staff, and a handle having operative connections with the stem for imparting longitudinal movement to the same and operative connections with the staff for imparting angular or turning movement to the same, the handle being disposed at that end of the staff remote from the head, the handle operative connections comprising a yoke in the crotch of which the handle is seated, the stem engaging in a socket in the handle, the yoke being provided with parallel arms, a guide ring in surrounding relation to the staff and slidable thereover and connected with the yoke arms on diametrically opposed sides, and a cap carried at the end of the staff and provided with ears having slots in which the yoke arms are slidably engaged.

3. A device for the purpose indicated comprising a flexible tubular staff, a head carried at one end of the staff and provided with pivotally mounted jaws, a flexible stem extending axially through the staff and movable longitudinally of the latter, the stem having an operative connection with said jaws to effect opening and closing movement of the same on relative movement between it and the staff, a handle operatively connected both with the staff and stem to impart angular or turning movement to the former and axial movement to the latter, and a guide tube in which the staff is slidably mounted.

In testimony whereof he affixes his signature.

RANDALL A. KING.